United States Patent [19]

MacIsaac

[11] Patent Number: 5,310,200

[45] Date of Patent: May 10, 1994

[54] VEHICLE SUSPENSION SYSTEM

[76] Inventor: William L. MacIsaac, 7911-40th Ave. West, Everett, Wash. 98203

[21] Appl. No.: 678,679

[22] Filed: Apr. 1, 1991

Related U.S. Application Data

[63] Continuation-in-part of Ser. No. 247,162, Sep. 21, 1988, Pat. No. 5,004,257.

[51] Int. Cl.$^5$ ............................................. B62D 9/02
[52] U.S. Cl. .................................. 280/112.2; 280/772
[58] Field of Search ............... 180/295, 298, 58; 280/781, 788, 112.2, 772, 700

[56] References Cited

U.S. PATENT DOCUMENTS

| 1,672,588 | 6/1928 | Turnidge et al. | 280/6 |
|---|---|---|---|
| 1,979,192 | 10/1934 | Burney | 280/112 |
| 2,154,463 | 4/1939 | Littman | 280/104 |
| 2,352,053 | 6/1944 | Wilfert et al. | 267/22 |
| 2,499,495 | 3/1950 | Gregory | 280/106.5 |
| 2,794,651 | 6/1957 | Kolbe | 280/112 |
| 3,408,088 | 10/1968 | Corbin | 280/96.2 |
| 3,831,965 | 8/1974 | Dickens | 280/96.2 |
| 3,917,306 | 11/1975 | Madler et al. | 280/104 |
| 4,133,554 | 1/1979 | Lampert | 280/689 |
| 4,484,767 | 11/1984 | Klem | 280/772 |
| 4,550,926 | 11/1985 | MacIsaac | 280/112 |
| 4,603,881 | 8/1986 | Mikina | 280/675 |
| 4,614,358 | 9/1986 | Wymann | 280/689 |
| 5,004,257 | 4/1991 | MacIsaac | 280/112.2 |

FOREIGN PATENT DOCUMENTS

| 828405 | 5/1938 | France . |
|---|---|---|
| 966475 | 10/1950 | France . |
| 978076 | 4/1951 | France . |
| 1033673 | 7/1953 | France . |
| 2269445 | 11/1975 | France . |
| 1036299 | 7/1966 | United Kingdom . |
| 1189705 | 4/1970 | United Kingdom . |
| 1299436 | 12/1972 | United Kingdom . |

Primary Examiner—Eric Culbreth
Attorney, Agent, or Firm—Christensen, O'Connor, Johnson & Kindness

[57] ABSTRACT

The body (12) of a vehicle (10) is mounted on forward and rearward wheels (16, 18) by an elongated tie structure (20) extending along the lower elevations of the vehicle. The tie structure (20) is connected to the body (12) to pivot about longitudinal and transverse axes (21L, 21T) that intersect at a pivot point (22) located at an elevation above the center of gravity of the vehicle. The tie structure (20) is connected to the wheels (16, 18) by pivot arm assemblies (26). Resilient first load control devices (136), forming part of the pivot arm assemblies (26), are interconnected between the tie structure and the vehicle wheels, and second load control devices (28) are connected between the body and the wheels, with the capacities of the first and second load-carrying devices selected to cause the pitch and roll stiffness of the tie structure to be greater than the pitch and roll stiffness of the body.

40 Claims, 5 Drawing Sheets

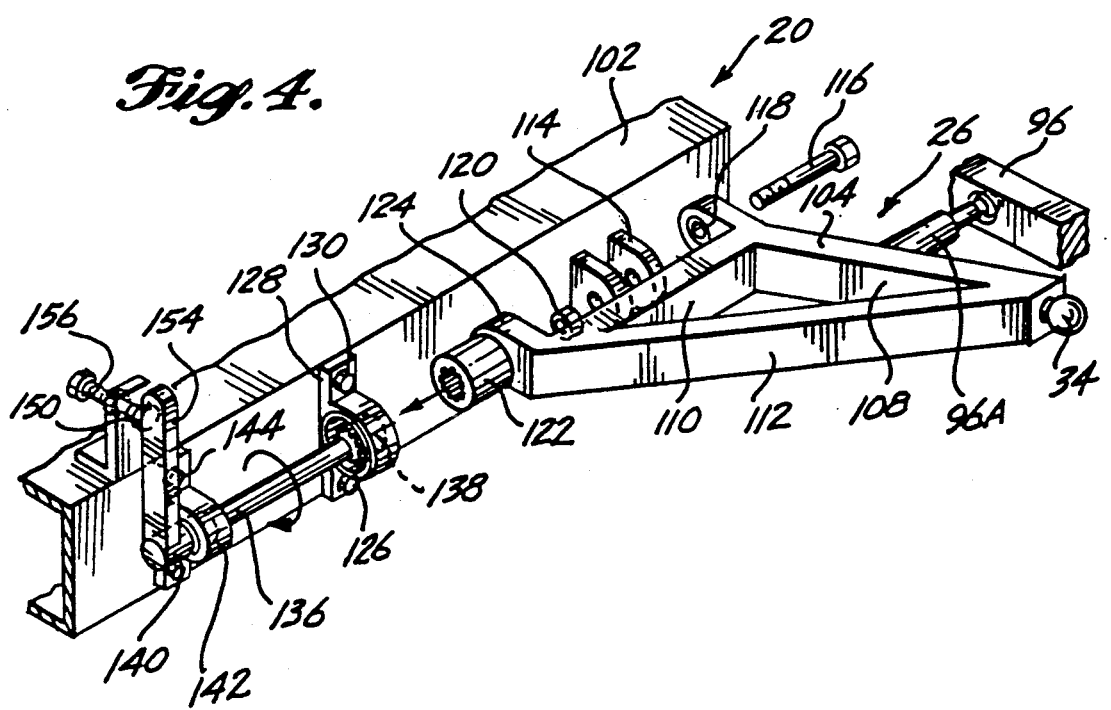

Fig. 6.
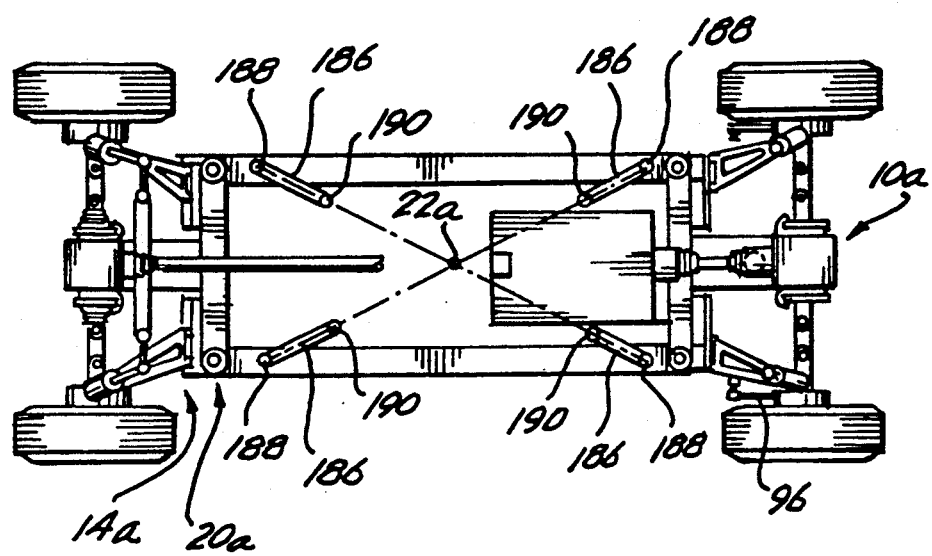
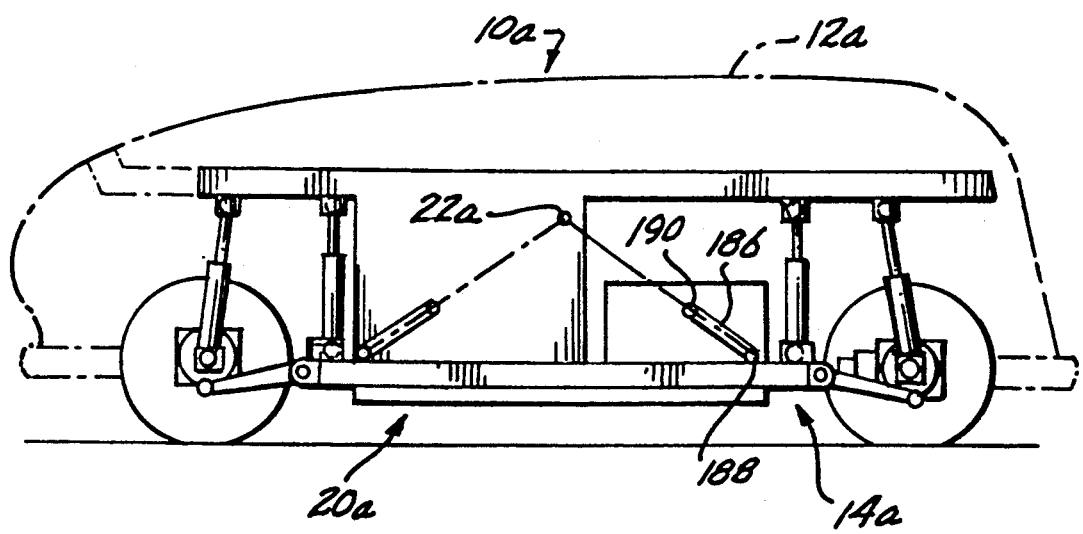
Fig. 5.

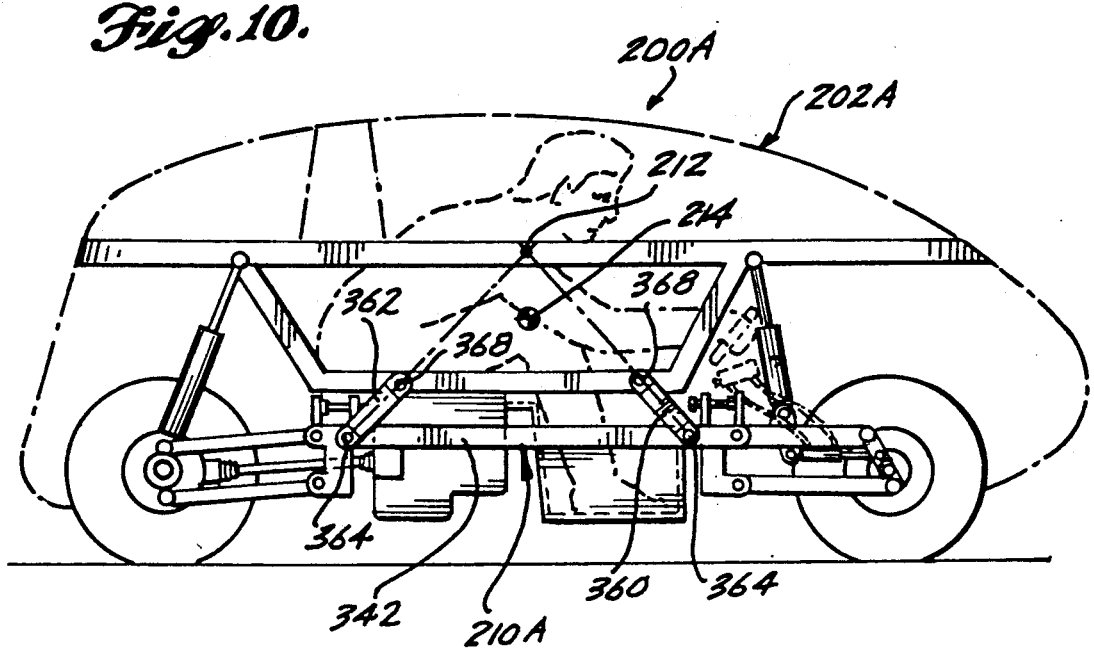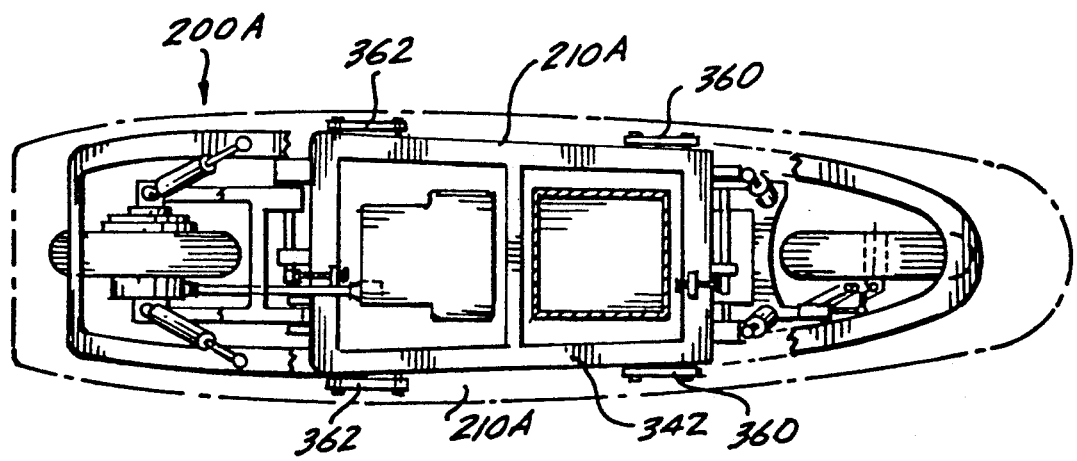

VEHICLE SUSPENSION SYSTEM

CROSS-REFERENCE TO RELATED APPLICATION

This is a continuation of application Ser. No. 07/247,162 filed Sep. 21, 1988, now U.S. Pat. No. 5,004,257.

TECHNICAL FIELD

The present invention relates to suspension systems for vehicles, and more particularly to a suspension system to counteract the longitudinal forces imposed on a vehicle during braking and acceleration, and also to simultaneously counteract both the lateral forces imposed on a vehicle during cornering and the longitudinal forces imposed on the vehicle during braking and acceleration.

BACKGROUND OF THE INVENTION

When negotiating a curve with a typical automotive-type vehicle, the resulting centrifugal forces roll the vehicle body and associated chassis (hereinafter jointly referred to as "body") about its roll center relative to the underlying suspension system, and also displace the body and suspension system laterally outwardly tending to cause the vehicle to pivot about its outer wheels. This latter tendency is commonly known in the motor vehicle art as the "jacking effect". During braking and acceleration, the resulting longitudinal forces acting on a typical automotive-type vehicle tend to pitch the body about its pitch center relative to the underlying suspension system and also tend to displace the body and suspension system forwardly during braking and rearwardly during acceleration to cause the vehicle to pivot about its front or rear wheels, respectively.

The locations of the roll center and pitch center are functions of the construction of the vehicle body and the configuration of the vehicle suspension system. In a conventional vehicle, the center of gravity of the vehicle is located above the roll center and pitch center. Since the centrifugal forces caused by cornering and the longitudinal forces caused by accelerating and braking act through the center of gravity of the vehicle, the magnitude of the couple tending to cause the body to roll about its roll center is a function of the magnitude of the centrifugal force and the vertical distance separating the center of gravity from the roll center and the magnitude of the couple tending to cause the body to pitch about its pitch center is a function of the magnitude of the longitudinal force and the vertical distance separating the center of gravity from the pitch center. These vertical distances are commonly known as the "roll couple" and "pitch couple", respectively.

In a typical vehicle, as the body rolls outwardly about its roll center, it tends to compress the outer suspension springs (relative to the radial center of the curve about which the vehicle is traveling) thus increasing the weight on the outer wheels while simultaneously unloading the inward suspension springs thereby reducing the weight on the inside wheels. As a result, the cornering traction of the vehicle is reduced. Also, as the body pitches forwardly about its pitch center during braking, it tends to compress the forward springs thus increasing the weight on the forward wheels while simultaneously unloading the rearward springs thereby reducing the weight on the rearward wheels. This resulting imbalance in the weight being carried by the forward and rearward wheels decreases the maximum braking capacity of the vehicle. The foregoing loading changes on the vehicle wheels caused by cornering and braking will occur simultaneously when the vehicle's brakes are applied while cornering, thereby potentially causing even greater imbalance on the weights on the vehicle wheels than caused by cornering alone or braking alone. This imbalance may result in the loss of substantially all of the fraction of one or more wheels.

The lateral force tending to cause a vehicle to pivot about its outer wheels, i.e., jacking effect, acts through the portion of the vehicle known as the roll reaction center. The longitudinal forces tending to cause a vehicle to pitch about its forward or rearward wheels acts through the pitch reaction center. In a conventional vehicle, the roll reaction center coincides with the roll center and the pitch reaction center coincides with the pitch center. As a result, the magnitude of the jacking effect is a function of the magnitude of the centrifugal force and the elevation of the roll reaction center above the ground, and the magnitude of the pitching effect is a function of the magnitude of the longitudinal braking-/acceleration force and the elevation of the pitch reaction center above the ground. With respect to the effect of cornering forces on a vehicle, the height of the roll reaction center above the ground is commonly known as the jacking couple, and with respect to the effect of braking and acceleration forces on the vehicle, the height of the pitch reaction center above the ground is commonly known as the pitching couple.

In conventional vehicles, attempts have been made to design the suspension system to minimize the height of the roll reaction center, thereby to reduce the jacking effect. Placement of the roll reaction center at a low elevation, however, results in the center of gravity of the body being located at a substantial distance above the roll center, thereby increasing the magnitude of the roll couple. The increase in the roll couple results in decreased stability of the vehicle, especially since in typical suspension systems the body roll and jacking effect are cumulative, both reducing the cornering ability of the vehicle.

SUMMARY OF THE INVENTION

The present invention seeks to reduce the detrimental effects on vehicle handling caused by braking, by acceleration, by simultaneous cornering and braking, and by simultaneous cornering and acceleration. The present invention constitutes an improvement of the vehicle suspension system disclosed in applicant's prior U.S. Pat. No. 4,550,926 which simply concerns suspension systems for counteracting cornering forces imposed on vehicles. Enhanced vehicle handling is achieved by the present improved suspension system in which not only do the roll couple and jacking couple oppose each other, thereby causing the body roll to counteract the jacking effect, but also the pitch couple and the pitching couple oppose each other thereby causing the body pitch to counteract the pitching effect thus improving the cornering traction of the vehicle, the braking traction of the vehicle, the acceleration traction of the vehicle (especially in a front-wheel-drive-vehicle), the simultaneous cornering and braking traction of the vehicle and the simultaneous cornering and acceleration traction of the vehicle. To this end, the vehicle suspension system of the present invention is joined to the vehicle body to pivot about transverse and longitudinal axes located above the center of gravity of the vehicle body so that the cornering forces acting through the center of gravity tilt the body about the longitudinal axis inwardly into the curve and so that simultaneously the longitudinal braking or acceleration forces acting through the center of gravity tilt the body about the transverse axis toward the rear or front, respectively, of the vehicle.

To this end, in a first generalized form of the present invention, the suspension system includes wheel mounting members located on opposite sides of the front and rear of the vehicle body. Load control devices in the form of suspension springs support the weight of the body on the wheel mounting members. The wheel mounting members include hub carriers on which the vehicle wheels are mounted. A tie structure extends along the lower portion of the vehicle to span between the front-wheel mounting members and the rear-wheel mounting members. The tie structure is interconnected to the body about transverse and longitudinal axes located at elevations above the center of gravity of the vehicle so that when cornering and at the same time braking or accelerating, the resultant forces imposed on the body acting through the center of gravity cause the body to tilt downwardly about the axes relative to the tie structure in the direction opposite to the direction of the resultant forces acting on the body by virtue of the cornering and the braking or acceleration of the vehicle.

The tie structure is interconnected to the vehicle support means by suspension arms. Load control devices are utilized with the suspension arms to permit controlled relative movement therebetween. The suspension arms and load control devices together permit the tie structure and thus the longitudinal roll axis and the transverse pitch axis to shift relative to the vehicle support means in a controlled manner in the direction of the resultant forces imposed on the body during cornering, braking and acceleration thereby to preclude the roll axis, the pitch axis or the combined pitch and roll axis of the vehicle to serve as the roll reaction center, pitch reaction center or the combined roll and pitch reaction center of the vehicle. As a result, the jacking effect and pitching effect on the vehicle are reduced.

The capacities of the load control devices used to support the vehicle body on the wheel mounting members and the load control devices utilized at the interconnection of the tie structure to the wheel mounting members are selected so that the movement of the tie structure is less than the movement of the body. In particular, the capacities of the load control devices are selected to cause the roll stiffness and pitch stiffness of the tie structure to be greater than the roll stiffness and pitch stiffness of the body. As a result, not only does the vehicle body roll and pitch in the opposite direction in comparison to a conventional vehicle thereby maintaining more even loading on the vehicle whole, but also simultaneously the jacking effect and pitching effect are reduced.

In a first particularized form of the present invention, the tie structure is interconnected with the wheel mounting members by pivot arm assemblies that are pivotally pinned to the tie structure to rotate about a transverse axis and are connected to the wheel mounting member to rotate about a point. Load control devices control the movement of the arm assembly about its interconnections with the tie structure and with the wheel mounting member in response to loads imposed on the vehicle, including those caused by road bumps during travel of the vehicle and those caused by cornering, accelerating and braking of the vehicle.

In a further, particularized aspect of the present invention, the load control devices include springs interconnected between the pivot arm assemblies and the tie structure.

In a further, more particularized aspect of the present invention, the springs may include a torsion bar assembly having a torsion bar disposed in alignment with the transverse axis about which the pivot arm assembly pivots relative to the tie structure. One end of the torsion bar is anti-rotationally connected to the pivot arm assembly and the distal, second end of the torsion bar is anchored relative to the tie structure to allow the second end of the torsion bar to rotate freely in one direction while preventing the torsion bar from rotating in the opposite direction.

In another generalized form of the present invention, the vehicle includes front- and rear-wheel mounting members. First load control devices are used to support substantially all of the weight of the vehicle body on the wheel mounting members. A tie structure is interposed between the wheel mounting members and the body. An interconnection assembly pivotally interconnects the tie structure and the body about a transverse pitch axis located at an effective elevation above the center of gravity of the body so that the forces imposed on the body by the braking or acceleration of the vehicle cause the body to tilt downwardly about the pitch axis relative to the tie structure in the direction opposite to the direction of the longitudinal force acting on the body during braking or acceleration. Another interconnection system is utilized to interconnect the tie structure to the wheel mounting members. This further interconnection system includes load control devices that control the extent that the pitch axis can shift relative to the wheel mounting members in the direction of the resultant longitudinal forces imposed on the body during braking and acceleration thereby to preclude the pitch axis from serving as the pitch reaction center of the vehicle.

In a particularized form of the present invention, the interconnection system between the tie structure and wheel mounting members includes a pair of spaced-apart upper and lower arms extending between the wheel mounting members and the tie structure. At one end, the upper and lower arms are pivotally pinned to the wheel mounting members while the opposite ends of the upper and lower arms are pivotally pinned to the tie structure. Directional load control devices control the movement of the upper and lower arms relative to the tie structure in response to loads imposed on the vehicle, including those caused by accelerating and braking.

In a further, particularized aspect of the present invention, the directional load control devices include springs interconnected between the upper and lower arms and the tie structure.

In a further, more particularized aspect of the present invention, the directional control devices may include a torsion bar which serves to pivotally connect the arms to the tie structure. An intermediate portion of the torsion bar is anti-rotationally secured to either the upper or lower arm. The free ends of the torsion bar are rotatably axled to the tie structure. The torsion bar, at a location distal from its connection to the upper or lower arm, is restrictively connected to the tie structure to permit the torsion bar to rotate in one direction but not in the opposite direction. A system is provided to apply a desired level of adjustment on the torsion bar.

BRIEF DESCRIPTION OF THE DRAWINGS

The details of typical embodiments of the present invention will be described in connection with the accompanying drawings, in which:

FIG. 4 is an enlarged, fragmentary, partially schematic view specifically illustrating the pivot arms and springs used to interconnect the tie structure of the present invention to the vehicle wheels;

FIG. 5 is a side elevational view, partially in schematic, of another embodiment of a vehicle suspension system of the present invention;

FIG. 6 is a partially schematic top view of the vehicle suspension system illustrated in FIG. 5;

FIG. 10 is a partially schematic side elevational view of an additional preferred embodiment of the present invention incorporated into a two-wheeled vehicle; and, FIG. 11 is a partially schematic top view of the present invention illustrated in FIG. 10.

DETAILED DESCRIPTION

Figure 1:
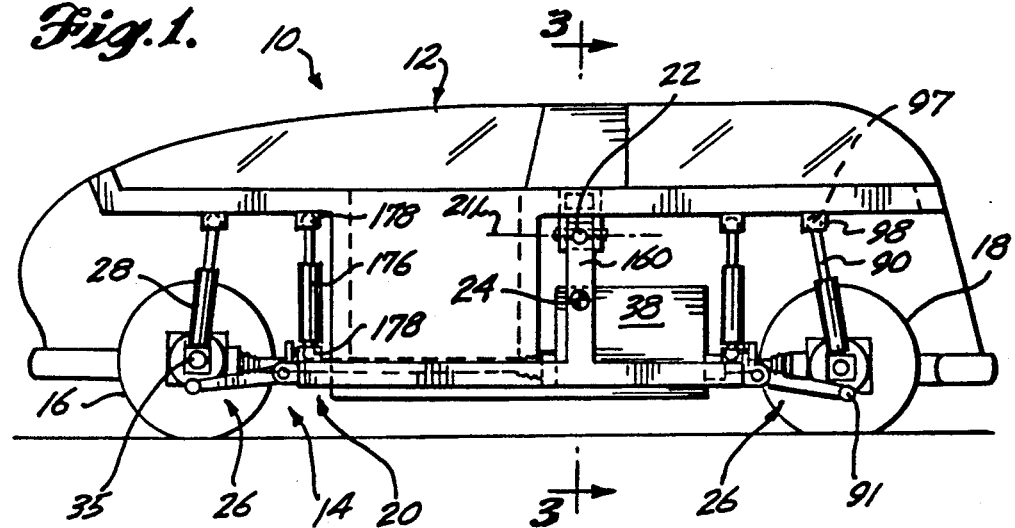
FIG. 1 is a side elevation view, partially in schematic, of a vehicle suspension system constructed according to the present invention.
Figure 2:
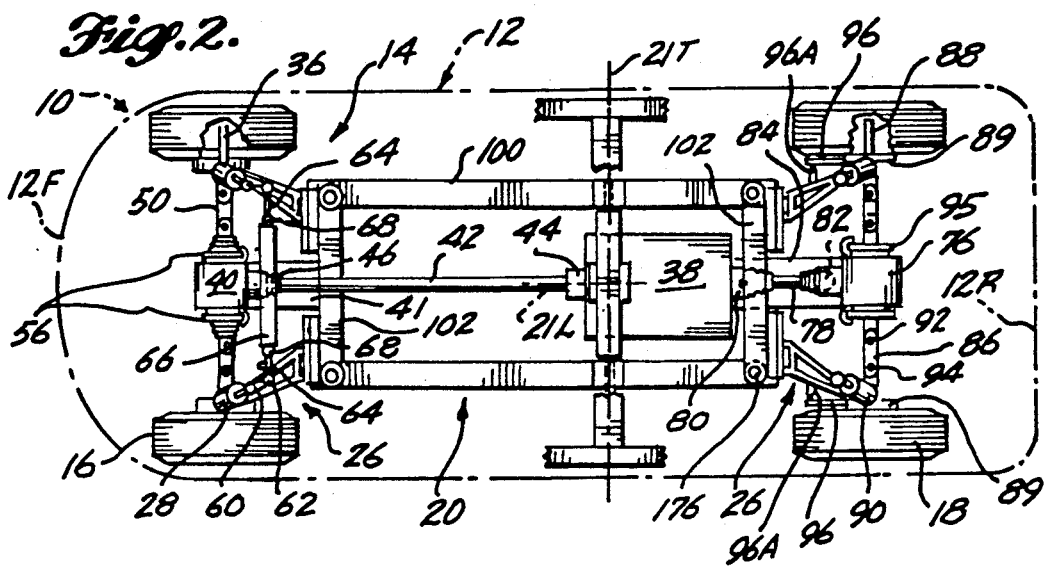
FIG. 2 is a partially schematic top view of the vehicle suspension system illustrated in FIG. 1.
Figure 3:
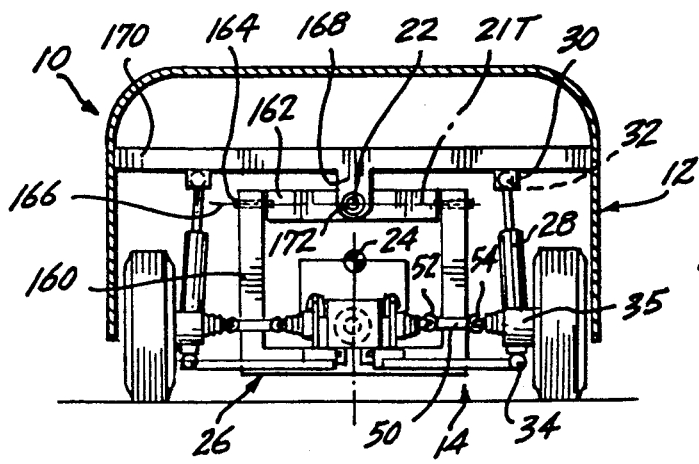
FIG. 3 is a cross-sectional view of the suspension system illustrated in FIGS. 1 and 2, taken substantially along section lines 3—3 of FIG. 1.

Referring initially to FIGS. 1-3, a vehicle 10 having a body 12 is shown as mounted on a suspension system 14 of the present invention which, in turn, is supported on forward wheels 16 and rearward wheels 18. An elongated tie structure 20 is interposed between the vehicle body 12 and the wheels 16 and 18, which tie structure extends longitudinally along the lower elevations of the vehicle. The tie structure 20 is interconnected to the body 12 to pivot about longitudinal axis 21L and transverse axis 21T that intersect at a pivot point 22 located at an elevation above the center of gravity 24 of the vehicle 12. The tie structure 20 is also connected to the wheels 16 and 18 by pivot arm assemblies 26.

As used in the present application, the term "body" is intended to include a relatively rigid structure comprising a chassis, a frame, the body thereof, and any additional supports and members rigidly attached thereto for accommodating the suspension system of the present invention. The body has a forward portion 12F and a rearward portion 12R. The body may be constructed with a conventional body and an underlying chassis, may be in the form of a unibody constructed with an integral chassis, or may be constructed in other manners without departing from the spirit or scope of the present invention.

At the front of the vehicle 10, as shown in FIGS. 1 and 2, the suspension system 14 includes load supporting and control devices in the form of combination spring/shock absorber assemblies 28 for supporting the vehicle body 12. The upper ends of the spring/shock absorber assemblies 28 are secured to overhead portions of the body by brackets 30 which are adapted to receive ball joints 32 attached to the upper ends of the spring/shock absorber assemblies 28. The lower ends of the spring/shock absorber assemblies 28 are interconnected to the forward hub carriers 35. At their lower ends, the hub carriers are connected to the forward ends of the pivot arm assemblies 26 by ball joints 34. Half shafts 36, on which wheels 16 are mounted, are journaled within the hub carriers 35 by bearings, not shown. Spring/shock absorber assemblies, such as assemblies 28, are well known in the art and are commonly referred to as MacPherson struts. MacPherson struts are widely used in conjunction with the front drive axles of front-wheel-drive vehicles and also with the rear wheels of the vehicle.

The half shafts 36 are driven by an engine and transmission assembly (hereinafter "engine") 38 through the intermediacy of a differential 40. The engine 38 is mounted on and carried by a lower portion of the body 12. The differential, on the other hand, is carried by the forward portion of the tie structure 20 by a cantilevered support plate 41 extending forwardly from the tie structure 20. The differential, however, could be mounted on the body along with the engine. A drive shaft 42 interconnects the engine 38 with the differential 40. Preferably a "plunge type" universal joint 44 is utilized to interconnect the drive shaft 42 to the engine 38 and a "regular" universal joint 46 is employed to interconnect the opposite end of the drive shaft to the differential 40. This arrangement accommodates both relative angular and relative longitudinal movement between the engine 38 and the differential 40.

Transverse drive shafts 50 extend outwardly from opposite sides of the differential 40 to drive the half shafts 36. The ends of the drive shafts 50 are provided with "constant velocity" or "plunge type" universal joints 52 and 54 to permit the front wheels to turn relative to the tie structures and body, including to turn during steering, to move up and down when traveling over road bumps, etc. while still providing positive drive to the wheels. Such constant velocity and universal joints are well known in the art. Inboard brake assemblies 56 are disposed between the differential 40 and the drive shafts 50. The inboard brake assemblies 56 are in lieu of the more "conventional" arrangement wherein the brakes are located adjacent the hub carriers 35.

As perhaps best illustrated in FIG. 2, steering arms 60 extend rearwardly from the lower portions of each hub carrier 35 to interconnect with the outer ends of transverse steering rod assemblies 64 through the use of ball joints 62. The steering rod assemblies 64 extend outwardly from a rack-and-pinion assembly 66 mounted on the tie structure 20. Each end of the steering rack assembly 66 includes a ball joint 68 to permit the steering rod 64 to pivot in response to the up-and-down and other movement of the front wheels relative to the tie structure 20.

The rear wheels 18 are also driven by the engine 38 through the intermediacy of a rear differential 76. The engine 38 is interconnected to the differential 76 by a rear drive shaft 78. A "plunge type" universal joint 80 is employed to interconnect a forward end of the drive shaft 78 to the output of the engine 38. At its rearward end, the drive shaft 78 is connected to differential 76 by a "regular" universal joint 82. The rear differential 76 is supported in cantilever fashion from the rear portion of the tie structure 20 by a mounting plate 84. Transverse drive shafts 86 extend outwardly from opposite sides of the rear differential 76 to interconnect the differential wit half shafts 88 journaled within hub carriers 89, connected to the lower end portions of rear load supporting and control devices in the form of spring/shock absorbers 90, in the same manner that the forward half shafts 36 are journaled within the forward hub carriers 35. At their lower ends, the hub carriers 89 are connected to the rear ends of the pivot arm assemblies 26 by ball joints 91. Constant velocity and/or universal joints 92 and 94 are provided at the inboard and outboard ends, respectively, of the drive shafts 86 to permit independent vertical and other direction of movement of the rear wheels 18, while still providing positive drive to the wheels. Inboard brake assemblies 95 are disposed between the rear differential 76 and the universal joints 92 to apply a braking force to the rear wheels 18. Brake assemblies, such as inboard brakes 95, are known in the art. Toe alignment arms 96 extend forwardly from the rear hub carriers 89 to detachably connect to lateral arms 96a extending outwardly from the pivot arm assemblies 26. The standout of the lateral arms 96a may be adjusted in the lateral direction thereby to adjust the toe alignment of the rear wheels 18.

The rear spring/shock absorber assemblies 90 support the rear of the vehicle body. The upper ends of the spring/shock absorber assemblies 90 are secured to overhead portions of the body by brackets 97 which are adapted to receive ball joints 98 attached to the upper ends of the spring/shock absorber assemblies. The lower ends of the spring/shock absorber assemblies 90 are rigidly interconnected to the hub carriers 89.

Still referring specifically to FIGS. 1–3, the tie structure 20 of the present invention is generally rectangular in shape in plan view and extends longitudinally along the lower elevations of vehicle 10 between the pivot arm assemblies 26 of the forward and rearward wheels 16 and 18. In one preferred form of the present invention, the tie structure 20 may be composed of elongate side members 100 and transverse forward and rearward end crossmembers 102. Additional reinforcing members may be added to the tie structure 20 if needed. The tie structure 100 may be constructed from any appropriate materials, such as tubing or channel stock. Moreover, the tie structure may be constructed in other configurations without departing from the spirit or scope of the present invention.

Additionally referring to FIG. 4, in each corner the tie structure 20 is connected to the hub carriers 35 and 89 by the pivot arm assemblies 26. Each pivot arm assembly 26 includes a generally triangular-shaped pivot arm 104 composed of a longitudinal member 108, a transverse member 110, and a diagonal member 112, which cooperatively form the triangular shape. The pivot arm 104 is adapted to pivot relative to the tie structure 20 about a transverse axis. To this end, the end of each pivot arm longitudinal member 108 extends beyond the transverse member 110 to be closely receivable between a pair of mounting ears 114 extending longitudinally from the end crossmember 102 of the tie structure 20. A pivot pin 116 extends through the center of a bushing 118 pressed within a bore formed in the end of the longitudinal member 108, as well as through close-fitting through bores formed in the mounting ears 114. A nut 120 or other appropriate type of fastener may be engaged with the pin 116 to retain the pivot arm 104 to between the two mounting ears 114.

A cylindrical stub shaft 122 extends transversely from an extension 124 of the pivot arm diagonal member 112 that extends beyond the transverse member 110 in the same manner in which the longitudinal member 108 of the pivot arm extends beyond the transverse member 110. The stub shaft 122 engages within a close-fitting bushing 126 pressed within a bore formed in a mounting bracket 128, which is secured to the adjacent face of the tie structure end crossmember 102. The mounting bracket 128, which may be composed of a standard, commercially available pillow block, is mounted on the crossmember 102 by any appropriate means, such as by hardware members 130, extending through openings formed in the flange portions of the mounting bracket and into engagement with the end crossmember 102. It will be appreciated that, by this construction, the pivot arm 104 is adapted to freely pivot about its transverse axis.

Each pivot arm assembly 26 also includes a spring-type directional control device in the form of a straight, elongate torsion bar 136 having a splined end 138 for anti-rotational engagement with the correspondingly splined interior of a stub shaft 122. The opposite end of the torsion bar extends through the close-fitting bushing 140 pressed within a mounting bracket 142. The mounting bracket 142 is secured to the adjacent face of the end crossmember 102 of the tie structure 20 by any appropriate method, for instance, by hardware members 144 extending through holes formed in the flange portions of the mounting bracket 142 to threadably engage the end member 102. As with mounting bracket 128, the mounting bracket 142 may be composed of a standard, commercially available pillow block.

The torsion bar 136 is adjusted to impose no appreciable load when the vehicle is at rest and in a level orientation. This is accomplished by adjusting the position of a bearing plate 150 relative to the free end of a cantilevered swing arm 154 extending upwardly from the end of the torsion bar 136, which extends beyond the mounting bracket 142. The lower end of the swing arm 154 is fixedly attached to the torsion bar 136 by any appropriate method, for instance, by use of splines, not shown, or weldments, not shown. The bearing plate 150 is carried by the lead end of a lead screw 156, or similar member, extending outwardly from the tie structure 20. It will be appreciated that the location of the bearing plate is adjusted by rotation of the lead screw 156.

Referring again to FIGS. 1–3, the tie structure 20 is connected to the body 12 through the use of a pair of side posts 160 extending upwardly from intermediate locations along the tie structure side members 100. An upper crossmember 162 spans between the upper ends of the post 160 and is pinned thereto by pins 164 thereby to pivot about a transverse axis 21T. The crossmember 162 is pivotally connected to a yoke 168 extending downwardly from a body crossmember 170 at the transverse center of the body 12 located along the longitudinal axis 21L by a longitudinal pin 172 extending through close-fitting openings formed in the yoke and through a close-fitting clearance hole formed in the crossmember 162. It will be appreciated that by this construction, posts 160, crossmember 162, pins 164, yoke 168, and pin 172 cooperatively define a gimbal arrangement which permits the body 12 to simultaneously roll and pitch relative to the tie structure 20 about the pivot point 22 defined by the intersection of the transverse axis 21T of pins 166 and the longitudinal axis 21L of pin 172.

Preferably, substantially all of the weight of the body 12 is carried by the front and rear spring/shock absorber assemblies 28 and 90, rather than by the posts 160 and crossmember 162. As a result, the posts 160, crossmember 162 and the body 12 itself do not have to be constructed with the level of structural integrity as would be required if a substantial portion of the weight of the body was carried through the pivot point 22.

To provide stability and to limit the roll and pitch of the body 12 relative to the tie structure 20, load support and control devices in the form of shock absorbing struts 176 may be used to interconnect the four corners of the tie structure 20 with overhead portions of the body 12. A ball and socket type of connection 178 is utilized at each end of the struts 176 to enable the struts to accommodate the relative movement occurring between the body 12 and the tie structure 20. It is to be understood that struts 176 may not be desired and/or required in certain vehicles, for instance, if sufficient body pitch and roll control is achieved by load support and control devices 28 and 90.

Next, describing the operation of the suspension system 14, when the vehicle 10 negotiates a corner, the centrifugal forces acting on the body 12 and the tie structure 20 cause the outward pivot arm assemblies 26 to pivot about the tie structure to wind up the torsion bars 136 thereby to allow the outward side of the tie structure to lower somewhat. Simultaneously, the centrifugal forces acting on the body 12 and the tie structure tend to cause the inward pivot arm assemblies to pivot in the opposite direction about the tie structure 20 thereby allowing the inward side of the tie structure to raise upwardly somewhat. This rolling movement of the tie structure prevents the pivot point 22 from acting as the roll reaction center, i.e., the elevational point through which the lateral forces act to cause the jacking effect that tends to raise the inside wheels and roll the vehicle about its outside wheels. As a result, the effective roll reaction center of the vehicle is at an elevation below the pivot point 22, thus resulting in a lower jacking effect being imposed on the vehicle 10 during cornering.

During the time period in which the rolling movement of the pivot point 22 is taking place, the centrifugal force imposed on the body 12 acts at the center of gravity 24 resulting in the outward lateral movement of the center of gravity thereby causing the body to tilt about the longitudinal axis 21L at the pivot point 22, rather than imposing a high jacking effect on the vehicle. As a result the body is tilted inwardly about the axis 21L in the direction towards the center of the curve along which the vehicle 10 is traveling. Because the body is tilted, the driver and passenger are forced downwardly into their seats rather than sideways as in a conventional vehicle, thereby improving the driver and passenger comfort over conventional vehicles.

The combined spring/shock absorbers 28 and the torsion bars 136 are sized so that the roll stiffness of the tie assembly is higher than the roll stiffness of the body. Thus, the amount by which the tie structure rolls outwardly during cornering is significantly less than the amount by which the body at the same time tilts inwardly so that the net effect is to maintain the body in an inwardly tilted orientation relative to the tie structure.

Similar to the effect during cornering, when braking, the longitudinal forces acting on the body 12 and the tie structure 20 cause the forward pivot arm assemblies to wind up the torsion bars 136 whereby the pivot arms 104 are rotated relative to the tie structure 20 allowing the tie structure to tilt downwardly at its forward end. At the same time, the pivot arms 104 at the rear of the vehicle pivot about the tie structure 20 in the opposite direction thereby allowing the torsion bar to rotate freely so that the tie structure raises upwardly relative to the ground. The net effect of the lowering of the tie structure at its forward end and the raising of the tie structure at its rearward end causes the pivot point 22 to rock the pivot axis 22T thus to prevent the pivot axis from acting as the pitch reaction center, i.e., the elevational point through which the longitudinal forces act to cause the pitching effect that tends to raise the rearward wheels and pitch the vehicle about the forward wheels. As such, the effective pitch reaction center of the vehicle is at an elevation below the pivot point axis 22T, thus resulting in a lower pitch reaction being imposed on the vehicle 10.

Also, when the vehicle 10 is braked, the longitudinal forces imposed on the body 12 act in the forward direction at the center of gravity 24 thereby tilting the rear of the body 12 downwardly relative to the tie structure 20 about the transverse axis 21T. The spring/shock absorbers 28 and the torsion arms 136 are sized so that the extent to which the tie structure 20 is tilted downwardly in a forward direction is less than the extent to which the body 12 is tilted rearwardly about the pivot point 22 during braking so that the net effect is to tilt the body rearwardly about the pivot point 22. Because the rear end of the body is tilted downwardly, the driver and passengers are forced downwardly into their seats during braking, rather than forwardly as in a conventional vehicle, thereby also improving the driver and passenger comfort over conventional vehicles. It will be appreciated that during acceleration, the body 12 is tilted in the opposite direction about the transverse axis 21T, which functions as the pitch axis of the body 12, from the direction of tilt of the body 12 during braking.

By virtue of the intersection of the longitudinal and transverse axes 21L and 21T, thus forming a single point interconnection 22 between the body 12 and the tie structure 20, when the vehicle 10 negotiates a corner and is simultaneously braked, the resultant of the centrifugal and braking forces act through the center of gravity 24 to shift the center of gravity in the direction of such resultant centrifugal and longitudinal forces. As a result, the body 12 is tilted about the pivot point 22 in the direction opposite to the direction of the resultant of the centrifugal and longitudinal braking forces thereby to maintain a more uniform loading on the vehicle wheels 16 and 18 than in a vehicle that does not utilize the present invention.

The centrifugal force component of the combined forces acting on the body during simultaneous cornering and braking causes the body to maintain a compressive force on the inside spring/shock absorber assemblies 28 which in turn maintains a downward load on adjacent inside wheels 16 and 18, as opposed to a typical automotive vehicle wherein a decreased downward force is imposed on the inside wheels. The maintenance of an appreciable load on the inside wheels assists in counteracting the jacking effect on the vehicle. This improves the traction of the vehicle when cornering thereby enabling the vehicle to negotiate turns not only more rapidly, but also more safely.

Correspondingly, the longitudinal force component (acting in the forward direction) of the combined forces imposed on the vehicle during simultaneous cornering and braking maintains a downward load on the rear spring/shock absorber assemblies 90 which in turn maintain a downward load on the adjacent rear wheels 18. In a typical automobile, on the other hand, the forwardly directed longitudinal forces imposed on a vehicle during braking significantly decrease the downward force on the rearward wheels. The maintaining of a significant level of load on the rear wheels provided by the present invention assists in counteracting the pitching effect on the vehicle. This improves the traction of the vehicle while braking by achieving a more uniform load distribution between the forward wheels and the rearward wheels whereby sufficient weight is maintained on the rearward wheels to enable the rearward wheels to assist in the braking of the vehicle.

Although the body 12 has been described as being interconnected to the tie structure 20 to pivot about a longitudinal axis 21L and a transverse axis 21T that intersect at pivot point 22, it is possible to interconnect the body and tie structure to pivot relative to each other about a transverse axis and a longitudinal axis that do not intersect each other, i.e., the axes are located at different elevations above the ground. For instance, in FIG. 3, the transverse axis 166 of pins 164 could be located above or below the longitudinal axis of pin 172.

It will be understood that the suspension system 14 illustrated in FIGS. 1-4 may be modified by adjusting the torsion bars 136 to also carry the weight of body 12, thus eliminating the need for the forward and rearward spring/shock absorber assemblies 28 and 90. The loading of the torsion bar 136 is accomplished by advancing the lead screw 156 to cause the bearing plate 150 to push against the upper end of the swing arm 154. In this alternative configuration of the suspension system 14, it would be advisable to utilize either the struts 176 (interconnected between the body and the tie structure) or similar struts connected between the body and the hub carriers 89 to control the roll and pitch of the body 12 relative to the tie structure 20.

FIG. 5 illustrates an alternative preferred embodiment of the present invention wherein the suspension system 14a of a vehicle 10a is constructed with a tie structure 20a differing structurally somewhat from the tie structure 20 shown in FIGS. 1-4. The tie structure 20a is interconnected with the body 12a by four diagonal links 186 connected to the corners of the tie structure 20a to extend diagonally towards a central pivot point 22a, positioned at the same location relative to the vehicle 10 as the pivot point 22 shown in FIGS. 1-4. Each of the diagonal links 186 is pivotally connected to the tie structure 20a by lower ball joints 188 or other appropriate swivel joints, and each of the upper ends of the diagonal links is connected to the body by upper ball joints 190 or other suitable swivel joints. When the vehicle 10a is at rest on a level surface, longitudinal lines extending through the four diagonal links 186 intersect each other at the single pivot point 22a. The use of the ball joints 188 and 190 permits the body 12a to pivot relative to the tie structure 20a in the same manner in which body 12 is permitted to pivot relative to the tie structure 20, described above. Moreover, the operational characteristics of the suspension system 14a are essentially the same as the suspension system 14 described above, and thus provide the same advantages over a conventional suspension system as provided by suspension system 14. It will be appreciated that the suspension system 14a intrudes less into the interior of the vehicle envelope than does suspension system 14, which may be advantageous for certain types of vehicles requiring a large, unobstructed interior, such as station wagons and vans.

Figure 7:
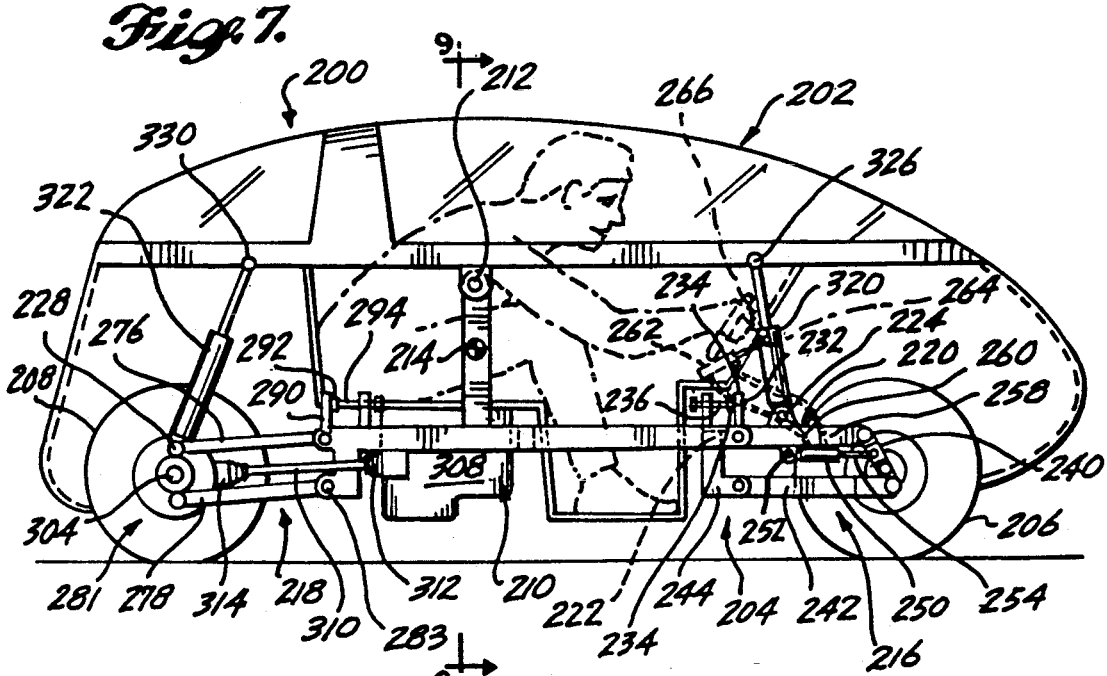
FIG. 7 is a partially schematic side elevational view of a further preferred embodiment of the present invention incorporated into a two-wheeled vehicle.
Figure 8:
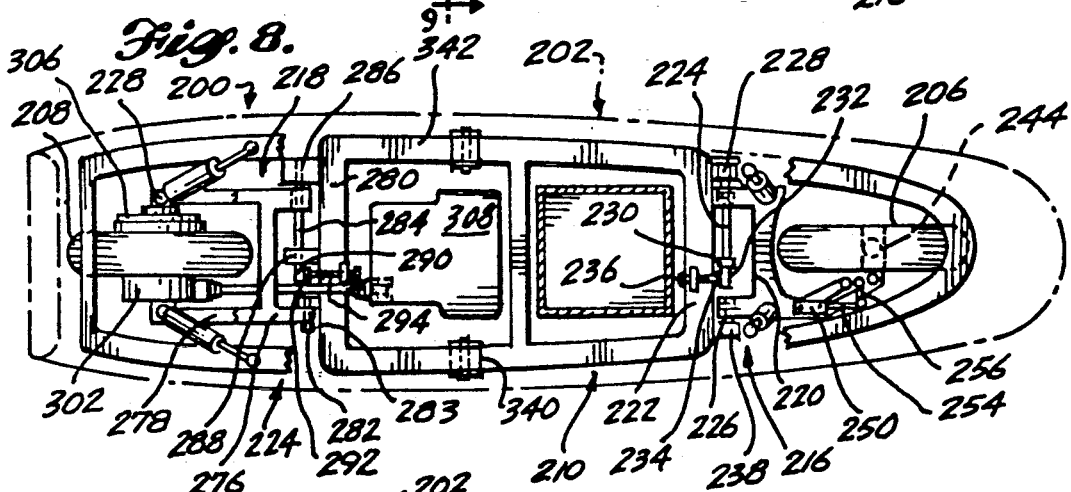
FIG. 8 is a partially schematic top view of the present invention illustrated in FIG. 7.
Figure 9:
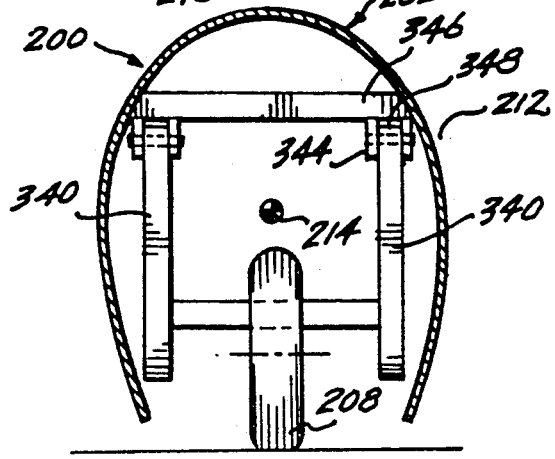
FIG. 9 is a partially schematic cross-sectional view of the vehicle suspension system illustrated in FIGS. 7 and 8, taken substantially along section lines 9—9 of FIG. 7.

Next referring to FIGS. 7-9, a further preferred embodiment of the present invention is illustrated wherein a two-wheel vehicle 200 having a body 202 is mounted on a suspension system 204 which, in turn, is supported by a forward wheel 206 and a rearward wheel 208. An elongated tie structure 210 is interposed between the vehicle body 202 and the wheels 206 and 208. The tie structure, which extends longitudinally along the lower elevations of the vehicle, is pivotally connected to the body along a transverse pivot axis 212 located at the elevation above the center of gravity 214 of the vehicle 200. The tie structure 210 is also pivotally connected to the forward wheel 206 through a leading "parallel" arm linkage system 216 and to the rearward wheel 208 through a trailing "parallel" arm linkage system 218.

Considering the constructional aspects of vehicle 200 in greater detail, the forward, leading parallel arm linkage system 216 includes an upper y-shaped arm 220 pivotally connected to the forward crossmember 222 of the tie structure 210 by a directional load control device in the form of a transverse torsion bar 224 and a transverse pivot pin 226. The torsion bar 224 is rotationally journaled within an outer mounting bracket 228 mounted on the front face of the left side of the crossmember 222 as shown in FIG. 8. The opposite, inward end of the torsion bar 224 is rotationally journaled within an inward bracket 230 also mounted on the front face of the crossmember 222. The torsion bar 224 is splined or otherwise anti-rotationally connected to the left fork of the upper arm 220 at a location adjacent the outer mounting bracket 228. A swing arm 232 extends upwardly from the end of the torsion bar 224 extending laterally beyond the inward mounting bracket 230. An adjustable stop 234 bears against the upper end of the arm 232 to restrict rotation of the torsion bar in a counterclockwise direction shown in FIG. 7. The stop 234 is mounted on a lead screw 236 carried by the tie structure 210. The standout of the lead screw 236 is adjusted so that the torsion bar 224 is unloaded when vehicle 200 is in a static condition on a level orientation.

The second fork of the upper arm 220 is pivotally pinned to a mounting bracket 238 mounted on the forward right hand side of the tie structure 210 (FIG. 8) by the pivot pin 226. The forward end of the upper arm 220 extends along the right side of the wheel 206 and is pivotally pinned to the upper end of a king pin 240. The lower end of the king pin is pivotally pinned to the forward end of a lower parallel arm 242. The king pin 240 is tilted rearwardly in the upward direction to provide the forward wheel 206 with a desired amount of castor as is typical in vehicles in the nature of vehicle 200. The lower parallel arm 242 is shaped similarly to the upper parallel arm 220, with the lower arm branching at its rearward end for pinned connection to brackets 244 extending downwardly and forwardly from tie structure forward crossmember 222.

It will be appreciated that, by the foregoing construction, the leading linkage system 216 is designed to pivot upwardly relative to the tie structure 210 against the resonance applied by the torsion bar, for instance, when passing over a road bump or during braking. The linkage system 216 also permits the forward wheel 206 to pivot freely downwardly relative to the forward end of the tie structure 210, for instance, when rebounding from a road bump or during hard acceleration.

The forward wheel 206 is mounted on a stub axle 244 extending laterally from the king pin 240 in a well-known manner. Steering of the forward wheel 206 is accomplished by an hydraulic system composed of an hydraulic linear actuator 250 mounted beneath the upper parallel arm 220 by a rearward bracket 252 which is connected to the rearward end of the hydraulic cylinder by a socket connection. The forward end of the rod 254 of the hydraulic cylinder 250 is pivotally pinned to the laterally outward end of a steering arm 256. Extension of the rod 254 causes the forward wheel 206 to turn to the left as shown in FIG. 8, whereas contraction of the rod causes the wheel to turn to the right as shown in FIG. 8. The steering cylinder 250 is connected in hydraulic fluid flow communication through lines 258 and 260 with a second hydraulic cylinder 262 mounted on the body 202. The rod 264 of the hydraulic cylinder 262 is operably connected to the steering handlebars 266 at a location offset from the pivot center of the handlebars so that as the handlebars are turned to the right, hydraulic fluid is transmitted from cylinder 258 to cause retraction of the rod 254 into cylinder 250 thereby rotating the forward wheel 206 to the right. Correspondingly, when the handlebars 266 are turned to the left, hydraulic fluid from cylinder 262 is routed to cylinder 250 to cause extension of rod 254 thereby rotating wheel 206 to the left.

The rear trailing, parallel arm linkage system includes upper and lower y-shaped arms 276 and 278, respectively having their forward ends pinned to the rear crossmember 280 of the tie structure 210 and their rearward ends pinned to a rear drive assembly 281 above and below, respectively, the centerline of the rear wheel 208. The forward ends of the lower parallel arm 278 and the forward right end of the upper parallel arm 276 are pinned to the rear crossmember 280 by transverse pivot pins 282 extending through aligned holes formed in spaced-apart mounting ears 283 and through close-fitting clearance holes formed in the forward ends of the parallel arms. In a manner similar to the leading linkage system 216, a directional load control device acts between the tie structure 210 and the rear parallel arm linkage system to allow the rear wheels to shift up and down in a dampened, controlled manner relative to the tie structure, for instance, when passing over road bumps or braking or accelerating. To this end, the directional control device may be in the form of a torsion bar 284 which is supported by a laterally spaced-apart outer mounting bracket 286 and an inward mounting bracket 288. The torsion bar 284 is free to rotate about its longitudinal axis within the mounting brackets 286 and 288. However, the torsion bar is splined or otherwise anti-rotationally connected to the forward, left-hand side, as shown in FIG. 8, of the upper parallel arm 276 at a location inwardly adjacent the mounting bracket 286. The distal, opposite end of the torsion bar 284, extending transversely beyond the inward mounting bracket 288, intersects a swing arm 290 which extends upwardly from the end of the torsion bar. A stop plate 292 bears against the upper end of the swing arm 290 to prevent the swing arm from rotating in the clockwise direction as shown in FIG. 7. The stop plate 292 is mounted on a lead screw 294 carried by the tie structure 210. Adjustment of the lead screw 294 causes the stop plate 292 to advance in the rearward direction shown in FIGS. 7 and 8 toward the swing arm, whereas rotation of the lead screw in the opposite direction retracts the stop plate away from the swing arm. Preferably, the stop plate 292 is positioned to abut against but not apply any load on the swing arm 290 when the vehicle 200 is in a level, static condition.

The rear wheel 208 is mounted on a rear drive assembly 281 composed of a ring and pinion assembly 302, a drive axle 304 and a rear brake assembly 306. Rear drive assemblies, such as the assembly 281, are commonly utilized in the art. The rear wheel 208 is driven by an engine and transmission assembly 308 (hereinafter simply referred to as the "engine") carried by the body 202. The engine 308 is interconnected to the ring and pinion assembly 302 by a drive shaft 310 having a forward end connected to the engine and a rearward end connected to the ring and pinion assembly by a "regular" universal joint 314 and/or a "pot type" universal joint 312. By this arrangement, the drive shaft 310 is capable of accommodating changes in the angular relationship of the engine 308 and the ring and pinion assembly 302 and also variations in the longitudinal distance separating the engine and the ring and pinion assembly during operation of the vehicle 200.

The body 202 is supported by forward and rearward load support and control devices in the form of spring/shock absorbers 320 and 322, respectively. The forward spring/shock absorbers 320 are mounted on opposite sides of the upper parallel arm 220 by pivot assemblies 224. From the parallel arm 220, the spring/shock absorbers 320 extend upwardly to interconnect with the body 202 through the use of pivot assemblies 326. In a similar manner, the lower ends of the rear spring/shock absorbers 322 are mounted on the rearward ends of the upper parallel arm 276 through the use of pivot assemblies 328. The upper ends of the spring/shock absorbers 322 are connected to the body 202 by pivot assemblies 330. It will be appreciated that the pivot assemblies 324, 326, 328 and 330 allow the spring/shock absorbers 320 and 322 to pivot at their upper and lower ends about transverse axes so that the body 220 can pivot relative to the tie structure 210 about the transverse pivot axis 212. Preferably, the forward spring/shock absorbers 320 extend somewhat rearwardly in the upwardly direction whereas the rear spring/shock absorbers 322 extend forwardly in the upward direction. Also, ideally substantially all of the weight of the body 202 is supported by the forward and rear spring/shock absorbers 320 and 322, rather than by the torsion bars 224 and 284.

The body 202 is pivotally connected to the tie structure 210 about transverse pivot axis 212 by laterally spaced apart posts 340 extending upwardly from corresponding longitudinal side members 342 of the tie structure 210. The forward ends of the tie structure side members 342 are interconnected by the forward crossmember 222 whereas the rearward ends of the side members are interconnected by the rear crossmember 280. The upper ends of the posts 340 are pinned to mounting ears 344 extending downwardly from a body crossmember 346 by transverse pins 348 which are in alignment with axis 212 which serves as the pitch axis for the body 202. Such pitch axis 212 is located above the center of gravity 214 of the body.

Next, describing the operation of the suspension system 204, when the vehicle 200 is braked or highly accelerated, the longitudinal force imposed on the body 202 acts through the center of gravity 214, causing the body to rotate about the pitch axis 212 to tilt the rear end of the body downwardly when braking or to tilt the front end of the body downwardly during hard acceleration. As a result, during braking of the vehicle 200, a downwardly load is maintained on the rear spring/shock absorbers 322 thereby in turn maintaining a substantial downward load on the rear wheels 208, as opposed to a typical vehicle wherein a significant portion of the downward force on the rear wheels is removed. The maintenance of a substantial load on the rear wheel assists in maintaining the loading on the front and rear wheels in a more uniform manner than in conventional vehicles, thereby improving the braking traction of the vehicle 200. In an opposite manner, when rapidly accelerating, the resulting rearward longitudinal force caused thereby acts through the center of gravity 214 tending to pivot the body 202 about the transverse axis 212 to tilt the forward end of the body downwardly. This acts to maintain a significant compressive force on the forward spring/shock absorber 320 and thus also on the forward wheel 216, as opposed to a typical vehicle wherein substantial unloading of the forward wheel occurs, perhaps even causing the forward wheel to leave the ground. The maintenance of a significant downward force on the forward wheel 206 during hard acceleration assists in maintaining control of the vehicle.

Also, during braking, the longitudinal forces acting on the vehicle 200 cause the forward end of the tie structure 210 to tilt downwardly relative to the forward wheel 206 and the rear end of the tie structure to tilt upwardly relative to the rear wheel 206. The resulting pitching movement of the transverse axis 212 prevents the axis from serving as the pitch reaction center of the vehicle, i.e., the elevational point through which the longitudinal forces act tending to cause the pitching effect that tends to raise the rear end of the vehicle about the forward wheel 206. Thus, the effective pitch center of the vehicle is at an elevation below the pitch axis 212 thus reducing the pitch jacking effect being imposed on the vehicle 200 during braking. Correspondingly, the pitch jacking effect imposed on the vehicle 200 during hard acceleration is also reduced.

By varying the size of the torsion bars 224 and 284 and by varying the sizes or other characteristics of the spring/shock absorber assemblies 320 and 322, the suspension system 204 can be tuned to achieve a lower pitch rate for the tie structure 210 than the pitch rate of the body 202 so that the body 202 is allowed to tilt to a greater degree about transverse axis 212 than the tilting of the tie structure so that during braking the net effect is to maintain a high load level on the rear wheel 208 than in a conventional vehicle and also so that during hard acceleration the net effect is to keep a greater load level on the forward wheel 206 than in a conventional vehicle.

Referring to a further preferred embodiment to the present invention shown in FIGS. 10 and 11, the tie structure 210a is connected to the body 202a of the vehicle 200a by a pair of forward diagonal links 360 and a pair of rearward diagonal links 362. The forward and rearward links are pinned to the end portions of the tie structure longitudinal side members 342 by transverse pins 364. The upper ends of the links 360 and 362 are pinned to body structural members 366 by transverse pins 368. The forward links 360 and rearward links 362 are angularly disposed so that when the vehicle is at rest on a level surface, straight lines extending through the links intersect each other at a transverse pivot axis 212a which is located above the center of gravity 214 of the body 202a in a manner similar to that in vehicle 200, shown in FIGS. 7-9. With the foregoing exception, suspension system 204a is constructed in substantially the same manner and operates in substantially the same manner as suspension system 204, described above. Thus, the suspension system 204a provides the same advantages and advancements provided by suspension system 204.

As apparent to those skilled in the art to which the invention is addressed, the present invention may be embodied in forms other than those specifically disclosed above without departing from the spirit or essential characteristics of the invention. The particular embodiments of the suspension systems 14, 14a, 204 and 204a described above are therefore to be considered in all respects as illustrative and not restrictive. The scope of the present invention is as set forth in the appended claims, rather than being limited to the examples of the suspension systems 14, 14a, 204 and 204a set forth in the foregoing description.

The embodiments of the invention in which an exclusive property or privilege is claimed are defined as follows:

1. A suspension system for a vehicle having a body and a drive train through which torque is transmitted for propelling the vehicle, comprising:
   (a) vehicle support means on opposite sides of the front and rear of the body;
   (b) a tie structure interposed between the vehicle support means and the body;
   (c) first means for interconnecting the tie structure to the vehicle support means, the first interconnecting means permitting the vehicle support means and the adjacent portion of the tie structure to elevate relative to each other in response to lateral and longitudinal forces imposed on the vehicle during cornering, braking and accelerating, the first interconnecting means being substantially devoid of torque transmitted through the vehicle drive train for propelling of the vehicle;
   (d) second means for pivotally interconnecting the tie structure and the body to enable the body to pivot relative to the tie structure about a body transverse pitch axis and simultaneously about a body longitudinal roll axis, both axes being located at effective elevations above the reaction center of the body, whereby upon forces being imposed on the body during turning, braking and accelerating, the body tilts downwardly about the body axis relative to the tie structure in the direction opposite to the direction of the resultant forces acting on the body during cornering, braking and acceleration; and,
   (e) load control means interposed between and interconnecting the body and the vehicle support means and also interposed between and interconnecting the tie structure with at least one of the body and the vehicle support means.

2. The suspension system according to claim 1, wherein the pitch axis and roll axis are located at effective elevations above the center of gravity of the vehicle.

3. The suspension system according to claim 1, wherein the second means for pivotally interconnecting the tie structure and the body about transverse and longitudinal pivot axes comprise a gimbal assembly.

4. The suspension system according to claim 1, wherein the transverse and longitudinal pivot axes about which the body and the tie structure are interconnected intersect each other to define a single pivot point.

5. The suspension system according to claim 1, wherein:
   the first interconnection means include a pivot arm assembly associated with each of the vehicle support means, the pivot arm assembly being pivotally pinned to the tie structure to rotate about an axis and being connected to an associated vehicle support means to rotate about a point; and,
   the load control means include first load control devices interconnected between the pivot arm assembly and tie structure to permit the arm assemblies to pivot about respective pivot axes in response to loads imposed upon the vehicle, including those caused by road bumps during travel of the vehicle and those caused by cornering, accelerating and braking of the vehicle.

6. The suspension system according to claim 5, wherein the first load control devices include spring means.

7. The suspension system according to claim 6, wherein the spring means comprise a torsion bar having a first end anti-rotationally connected to an arm assembly and a distal, second end anchored relative to the tie structure to prevent the second end of the torsion bar from rotating about its longitudinal axis at least in one direction.

8. The suspension system according to claim 7, further comprising means for adjusting the nominal load exerted by the torsion bar.

9. The vehicle suspension system according to claim 8, wherein the adjusting means include a swing arm extending transversely to the torsion bar at a location distal from the location at which the torsion bar is interconnected with the pivot arm assembly, a stop mounted in association with the tie structure to bear against the free end of the torsion arm, and means for positioning the stop at selected locations toward and away from the free end of the swing arm, thereby to vary the nominal position of the torsion arm.

10. The vehicle suspension system according to claim 5, wherein the load control means include second control devices for controlling the pitch and roll of the body.

11. The vehicle suspension system according to claim 10, wherein the second control devices are interconnected between the body and the tie structure.

12. A suspension system for a vehicle having a body, comprising:
   (a) vehicle support means on opposite sides of the front and rear of the body;
   (b) a tie structure interposed between the vehicle support means and the body;
   (c) first means for interconnecting the tie structure to the vehicle support means, the first connection means permitting the vehicle support means and the adjacent portion of the tie structure to elevate relative to each other in response to lateral and longitudinal forces imposed on the vehicle during cornering, braking, and accelerating;
   (d) second means for pivotally interconnecting the tie structure and the body to enable the body to pivot relative to the tie structure about a body transverse pitch axis and simultaneously about a body longitudinal roll axis, both axes being located at effective elevations above the reaction center of the body, whereby upon forces being imposed on the body during turning, braking and accelerating, the body tilts downwardly about the body axes relative to the tie structure in the direction opposite to the direction of the resultant forces acting on the body during cornering, braking and acceleration;
   (e) load control means interposed between and interconnecting the body and the vehicle support means and also interposed between and interconnecting the tie structure with at least one of the body and the vehicle support means; and,
   (f) wherein the second means for pivotally interconnecting the tie structure and the body about longitudinal and transverse axes include nominally diagonally disposed links having lower end portions pivotally connected to the tie structure and upper end portions extending toward a common point located between the opposite sides and between the front and rear of the body.

13. The suspension system according to claim 12, wherein the lower end portions of the links are pivotally connected to the tie structure at locations adjacent a corresponding vehicle support means.

14. The suspension system according to claim 12, wherein lines extending along the lengths of the diagonal links intersect each other at a common location above the reaction center.

15. A suspension system for a vehicle having a body, comprising:
   (a) vehicle support means on opposite sides of the front and rear of the body;
   (b) a tie structure interposed between the vehicle support means and the body;
   (c) first means for interconnecting the tie structure to the vehicle support means, the first connection means permitting the vehicle support means and the adjacent portion of the tie structure to elevate relative to each other in response to lateral and longitudinal forces imposed on the vehicle during cornering, braking, and accelerating;
   (d) second means for pivotally interconnecting the tie structure and the body to enable the body to pivot relative to the tie structure about a body transverse pitch axis and simultaneously about a body longitudinal roll axis, both axes being located at effective elevations above the reaction center of the body, whereby upon forces being imposed on the body during turning, braking and accelerating, the body tilts downwardly about the body axes relative to the tie structure in the direction opposite to the direction of the resultant forces acting on the body during cornering, braking and acceleration; and,
   (e) load control means interposed between and interconnecting the body and the vehicle support means and also interposed between and interconnecting the tie structure with at least one of the body and the vehicle support means, wherein the load control means causes the tie structure to pitch and roll relative to the vehicle support means to a degree less than the simultaneous and opposite pitch and roll of the body.

16. A suspension system for a vehicle having a body and drive system through which torque is transmitted for propelling the vehicle, comprising:

(a) vehicle support means on opposite sides at the front and rear of the body;

(b) a tie structure interposed between the vehicle support means and the body;

(c) first means for interconnecting the tie structure to the vehicle support means to permit the portion of the tie structure adjacent the vehicle support means to move elevationally relative to the vehicle support means during the turning, braking and accelerating of the vehicle, the first interconnecting means being substantially devoid of torque transmitted through the vehicle drive for propelling the vehicle;

(d) second means for pivotally interconnecting the tie structure to the body to enable the body to pivot relative to the tie structure about a transverse pitch axis and simultaneously about a longitudinal roll axis, both axes being located at effective elevations about the reaction center of the vehicle, whereby upon forces being imposed on the vehicle during turning, braking and accelerating, the body tilts downwardly about the axes relative to the tie structure in the direction opposite the direction of the resultant forces acting on the vehicle during cornering, braking and acceleration; and, (e) load control means operably interconnecting the tie structure to the vehicle support means and operably interconnecting the vehicle body to one of the tie structure and vehicle support means thereby to cause the tie structure to pitch and roll relative to the vehicle support means in directions opposite to and to a lesser extent than the simultaneous pitch and roll of the body relative to the tie structure, thereby to reduce the jacking effect on the vehicle during corner, braking and acceleration.

17. A suspension system on a vehicle having a body and a drive train through which torque is transmitted for propelling the vehicle, comprising:

(a) vehicle support means at the front and rear of the body;

(b) a tie structure interposed between the vehicle support means and the body;

(c) first means for interconnecting the tie structure to the vehicle support means to allow the portion of the tie structure adjacent the vehicle support means to move relative to the vehicle support means in the up and down directions in response to the forces imposed on the vehicle during accelerating and braking, the first interconnecting means being substantially devoid of torque transmitted through the vehicle drive train for propelling the vehicle;

(d) second means for pivotally interconnecting the tie structure and the body to enable the body to pivot relative to the tie structure about a transverses pitch axis at an effective elevation above the center of gravity of the vehicle, whereby upon forces being imposed on the vehicle by the braking and accelerating of the vehicle, the body tilts downwardly about the transverse axis relative to the tie structure in the direction opposite to the direction of the longitudinal force acting on the body during braking and acceleration; and, (e) load control means interposed between said interconnecting the body and the vehicle support means and also interposed between and interconnecting the tie structure with at least one of the body and the vehicle support means.

18. The vehicle suspension system according to claim 17, wherein said vehicle support means include a wheel mounting member having wheel mounting axle means thereon.

19. The vehicle suspension system according to claim 17, wherein the tie structure comprises a framework extending between the front and rear vehicle support means along the lower elevation of levels of the vehicle.

20. The vehicle suspension system according to claim 19, wherein the second interconnecting means include post means extending upwardly from the tie structure, and means for pivotally pinning an upper portion of the post means to the vehicle body along the transverse pitch axis at an elevation above the reaction center of the vehicle.

21. The vehicle suspension system according to claim 17, wherein the first interconnecting means include a pair of spaced-apart upper and lower arms extending between the vehicle support means and the tie structure, one end of the upper and lower arms being pivotally pinned to the vehicle support means and the opposite ends of the upper and lower arms being pivotally pinned to the tie structure.

22. The vehicle suspension system according to claim 21, wherein the load control means includes first load control devices interconnected between at least one of the upper and lower arms of the first interconnection means and the tie structure, and second load control devices interconnected between the body and either the tie structure or one of the upper and lower arms of the first interconnection means.

23. The vehicle suspension system according to claim 22, wherein the load-carrying capacities of the first and second load control devices are selected so that the pitch stiffness of the tie structure is greater than the pitch stiffness of the body.

24. The vehicle suspension system according to claim 22, wherein the first load control devices means further include spring means interconnected between at least one of the upper and lower arms and the tie structure to permit controlled relative movement between the upper and lower arms and the tie structure during operation of the vehicle.

25. The vehicle suspension system according to claim 24, wherein the load control means include support devices interconnected between the body and one of the tie structure and one of the upper and lower arms of the second interconnection means.

26. The vehicle suspension system according to claim 24, wherein the spring load/deflection rates of the spring means are selected to cause the pitch stiffness of the tie structure to be greater than the pitch stiffness of the body.

27. The vehicle suspension system according to claim 24, wherein the spring means comprise a torsion bar assembly having a torsion bar pivotally pinning at least one of the upper and lower arms of the first interconnection means to the tie structure.

28. The vehicle suspensions system according to claim 27, wherein the torsion bar is anti-rotationally connected to one of the upper and lower arms of the second interconnection means.

29. The vehicle suspension system according to claim 28, wherein the torsion bar, at a location distal to the location that the torsion bar is connected to one of the upper and lower arms, is restricted from rotation in at least one rotational direction.

30. The vehicle suspension system according to claim 28, wherein the torsion bar assembly includes means for adjusting the relative angular relationship between the tie structure and the first interconnection means at which the torsion bar initiates a resistive force to the further relative movement between the tie structure and the first interconnection means.

31. The vehicle according to claim 30, wherein the first adjusting means includes: a torsion arm extending transversely from the torsion bar at a location distal from the location at which the torsion bar is interconnected with one of the upper and lower arms to swing with the rotation of the torsion bar; a stop mounted in association with the tie structure to bear against the free end of the torsion arm; and means for positioning the stop at selected locations toward and away from the free end of the torsion arm.

32. The vehicle suspension system according to claim 17, wherein the vehicle support means include a front-wheel mounting member having a front-wheel mounting axle thereon for engaging a front wheel of the vehicle and a rear-wheel mounting member having a rear-wheel mounting axle thereon for engaging a rear wheel of the vehicle.

33. The vehicle suspension system according to claim 32, wherein the vehicle constitutes a two-wheeled vehicle.

34. The vehicle suspension system according to claim 17, wherein the pitch axis is at an effective elevation above the reaction center of the vehicle.

35. A suspension system for a vehicle having a body, comprising:
(a) vehicle support means at the front and rear of the body;
(b) a tie structure interposed between the vehicle support means and the body;
(c) first means for interconnecting the tie structure to the vehicle support means to allow the portion of the tie structure adjacent the vehicle support means to move relative to the vehicle support means in the up and down directions in response to the forces imposed on the vehicle during accelerating and braking;
(d) second means for pivotally interconnecting the tie structure and the body to enable the body to pivot relative to the tie structure about a transverse pitch axis at an effective elevation above the center of gravity of the vehicle, whereby upon forces being imposed on the vehicle by the braking and accelerating of the vehicle, the body tilts downwardly about the transverse axis relative to the tie structure in the direction opposite to the direction of the longitudinal force acting on the body during braking and acceleration;
(e) load control means interposed between and interconnecting the body and the vehicle support means and also interposed between and interconnecting the tie structure with at least one of the body and the vehicle support means; and,
(f) wherein the second means for pivotally interconnecting the tie structure and the body about the pitch axis include nominally diagonally disposed links having lower end portions pivotally connected to the tie structure and upper end portions extending toward a common point located between the front and rear of the body.

36. The vehicle suspension system according to claim 35, wherein the lower end portions of the lower end portions of the links are pivotally connected to the tie structure at locations adjacent a corresponding vehicle support means.

37. The vehicle suspension system according to claim 35, wherein lines extending along the lengths of the diagonal links intersect each other at a common location above the reaction center.

38. A suspension system for a vehicle having a body, comprising:
(a) vehicle support means at the front and rear of the body;
(b) a tie structure interposed between the vehicle support means and the body, the tie structure comprising a framework extending between the front and rear vehicle support means along the lower elevation levels of the vehicle;
(c) first means for interconnecting the tie structure to the vehicle support means to allow the portion of the tie structure adjacent the vehicle support means to move relative to the vehicle support means in the up and down directions in response to the forces imposed on the vehicle during accelerating and braking;
(d) second means for pivotally interconnecting the tie structure and the body to enable the body to pivot relative to the tie structure about a transverse pitch axis at an effective elevation above the center of gravity of the vehicle, whereby upon forces being imposed on the vehicle by the braking and accelerating of the vehicle, the body tilts downwardly about the transverse axis relative to the tie structure in the direction opposite to the direction of the longitudinal force acting on the body during braking acceleration;
(e) load control means interposed between and interconnecting the body and the vehicle support means and also interposed between and interconnecting the tie structure with at least one of the body and the vehicle support means; and,
(f) wherein the second interconnecting means include diagonally disposed links having lower-end portions pivotally connected to the tie structure at the forward and rearward ends of the tie structure and upper ends extending toward the transverse pitch axis.

39. The vehicle suspension system according to claim 38, wherein lines extending along the lengths of the diagonal links intersect each other at the pitch axis.

40. A suspension system for a vehicle having a body and a drive system through which torque is transmitted for propelling the vehicle, comprising:
(a) vehicle support means at the front and rear of the body;
(b) a tie structure interposed between the vehicle support means and the body;
(c) first means for interconnecting the tie structure to the vehicle support means to permit the portion of the tie structure adjacent the vehicle support means to move elevationally relative to the vehicle support means during braking and accelerating of the vehicle, the first interconnecting means being substantially devoid of the torque transmitted through the vehicle drive system to propel the vehicle;
(d) second means for pivotally interconnecting the tie structure and the body to enable the body to pivot relative to the tie structure about a transverse pitch axis at an effective elevation above the center of gravity of the vehicle, whereby during braking and acceleration of the vehicle, the body tilts downwardly about the transverse axis relative to the tie structure in the direction opposite the direction of the longitudinal forces acting on the body during braking and acceleration; and, (e) load control means operably interconnecting the first interconnection means and the tie structure and also operably interconnecting the body to one of the first interconnection means and the tie structure to support the weight of the body on the vehicle support means and to cause the tie structure to pitch relative to the vehicle support means in a direction opposite to and to a lesser degree than the simultaneous pitching of the body relative to the tie structure during acceleration and braking of the vehicle so as to reduce the jacking effect on the vehicle during braking and acceleration.

* * * * *

UNITED STATES PATENT AND TRADEMARK OFFICE
CERTIFICATE OF CORRECTION

PATENT NO. : 5,310,200
DATED : May 10, 1994
INVENTOR(S) : W.L. MacIsaac

It is certified that error appears in the above-indentified patent and that said Letters Patent is hereby corrected as shown below:

| COLUMN | LINE | |
|---|---|---|
| [56] "U.S. | 16th Ref. Patents" | Please add --4,093,255  6/1978  Wilfert et al.-- |
| 7 | 9 | "wit" should read --with-- |
| 8 | 5 | delete "to" |
| 15 | 6 & 7 | "downwardly" should read --downward-- |
| 15 | 23 | "forward wheel 216" should read --forward wheel 206-- |

Signed and Sealed this

Thirtieth Day of April, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,310,200
DATED : May 10, 1994
INVENTOR(S) : William L. MacIsaac

It is certified that error appears in the above-indentified patent and that said Letters Patent is hereby corrected as shown below:

| COLUMN | LINE | |
|---|---|---|
| 16 | 51 | "body" should read --vehicle-- |
| 16 | 52 | "body" should read --vehicle-- |
| 16 | 56 | "body" should read --vehicle-- |
| 17 | 17 | "assembly" should read --assemblies-- |
| 18 | 4 | "body" should read --vehicle-- |
| 18 | 5 | "body" should read --vehicle-- |
| 18 | 9 | "body" should read --vehicle-- |
| 18 | 50 | "body" should read --vehicle-- |
| 18 | 51 | "body" should read --vehicle-- |
| 18 | 55 | "body" should read --vehicle-- |
| 19 | 36 | "corner" should read --cornering-- |
| 20 | 60 | "suspensions" should read --suspension-- |

Signed and Sealed this

Tenth Day of September, 1996

Attest:

BRUCE LEHMAN

*Attesting Officer*     *Commissioner of Patents and Trademarks*